United States Patent [19]

Ambrico et al.

[11] Patent Number: 5,582,496
[45] Date of Patent: Dec. 10, 1996

[54] TOP LOCK JAM NUT APPARATUS AND METHOD

[75] Inventors: Salvatore Ambrico, Plantation; S. Wyatt Fuller, Parkland; John Suggs, Pompano Beach; Mark Radosevich, Coral Gables, all of Fla.

[73] Assignee: Top Lock Technology, Plantation, Fla.

[21] Appl. No.: 394,357

[22] Filed: Feb. 24, 1995

[51] Int. Cl.⁶ .......................... F16B 37/08; F16B 39/16
[52] U.S. Cl. ........................ 411/432; 411/243; 411/932
[58] Field of Search ...................... 411/243, 222, 411/244, 432, 931, 932, 916, 917, 429

[56] References Cited

U.S. PATENT DOCUMENTS

| | | | |
|---|---|---|---|
| 2,571,265 | 10/1951 | Leufven | 411/917 X |
| 2,696,236 | 12/1954 | Curran . | |
| 3,784,316 | 1/1974 | Bittern | 408/204 |
| 4,043,239 | 8/1977 | DeFusco . | |
| 4,240,670 | 12/1980 | Zorn et al. | 411/432 X |
| 5,137,408 | 8/1992 | Junkers | 411/222 X |
| 5,152,649 | 10/1992 | Popp | 411/55 |
| 5,205,693 | 4/1993 | Fuller et al. | 411/354 |
| 5,253,967 | 10/1993 | Orban et al. | 411/432 |

FOREIGN PATENT DOCUMENTS

| | | | |
|---|---|---|---|
| 174227 | 1/1922 | United Kingdom | 411/244 |

*Primary Examiner*—Neill R. Wilson
*Attorney, Agent, or Firm*—Oltman and Flynn

[57] ABSTRACT

A jam nut apparatus for fastening to a threaded end of a bolt to secure the bolt where the threaded end has first handed threads includes a locking nut having an internal nut passageway with nut internal threads, the nut passageway having a first passageway end with an inwardly extending locking flange, a bolt end cap having a tubular cap side wall, the cap side wall having an open end with a locking edge and an inner surface with first handed internal threads, for engagingly receiving the threaded end of the bolt, the cap also having an outer surface with second handed external threads opposite to the first handed thread direction, external threads onto which the locking nut threads engagingly fasten, where the locking nut threads are oriented in the second handed direction.

5 Claims, 1 Drawing Sheet

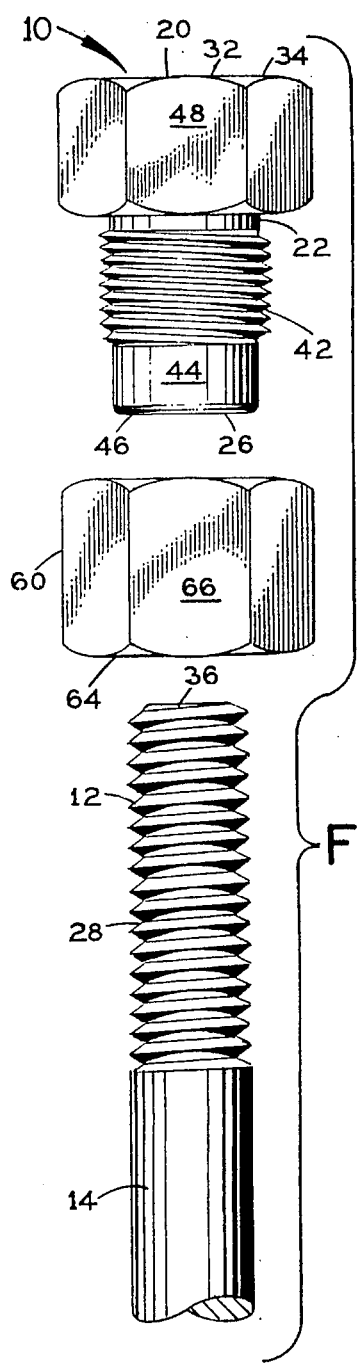
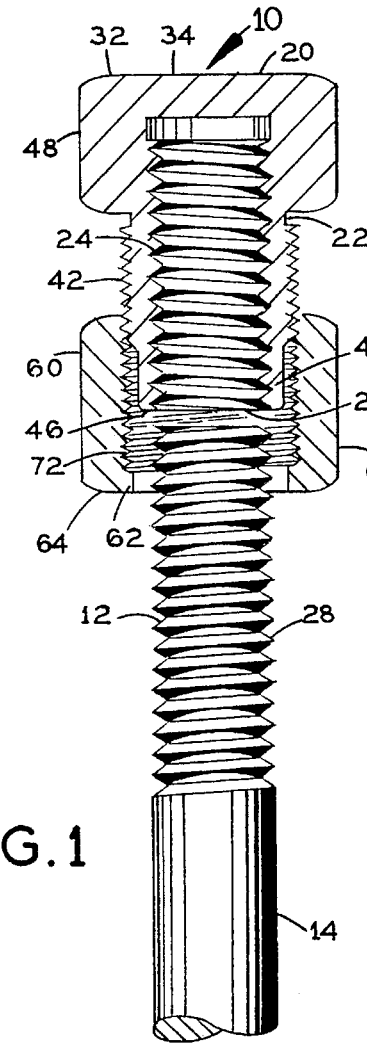
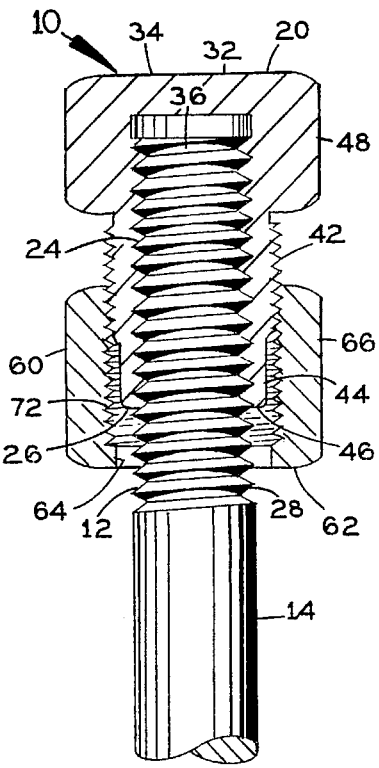
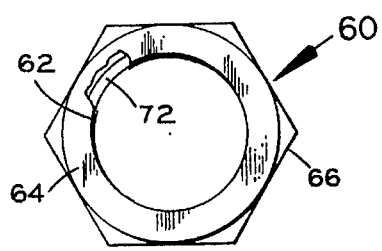
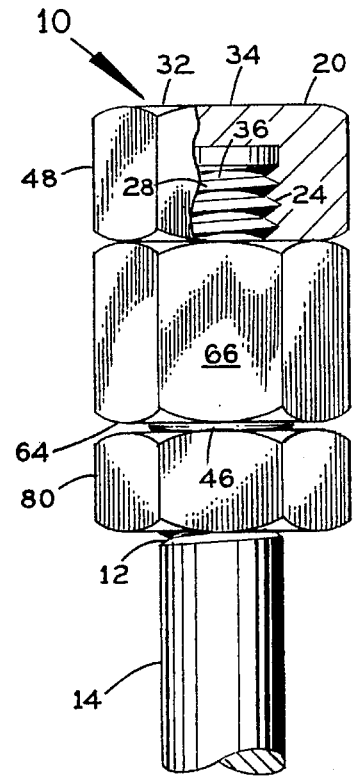

TOP LOCK JAM NUT APPARATUS AND METHOD

BACKGROUND OF THE INVENTION

1. Field of the Invention

The present invention relates generally to the field of jam-locking nut and bolt assemblies. More specifically, it relates to a jam nut apparatus for fastening to the threaded end of a bolt such as a lawn mower blade mounting bolt to secure the bolt against disengagement. The apparatus includes a tubular end cap and a locking nut.

The tubular end cap has a tubular wall with a threaded inner surface opening at a cap open end for engagingly receiving the threaded end of a bolt and a cap closed end having a cap end wall for abutting the end face of the inserted bolt. The cap also has an external threaded surface about which the locking nut engagingly fastens, and has a reduced diameter locking rim portion extending coaxially from the cap open end, having an inwardly beveled locking rim edge. The locking nut has an inwardly directed, radial locking flange at the nut outer end which fits around and over the cap locking rim portion when the locking nut is fastened onto the cap. The cap also has a hex head extending radially from the cap closed end to permit tightening of the cap with a wrench. The locking nut also has a hexagonal circumferential outer surface for wrench engagement. The internal cap threads are right-handed to receive a conventional bolt end. The external cap threads and locking nut threads are left-handed.

To use the inventive apparatus, the locking nut is fastened around the cap and the cap is fastened onto the bolt threaded end. Then the locking nut is rotated snugly against the member being secured. In this way, friction between the cap, and the locking nut and the member being secured prevent relative movement between the cap and the bolt, and thus hold the bolt assembly together against vibration. The cap is removable from the bolt by first rotatingly backing the locking nut away from the member being secured.

2. Description of the Prior Art

There have long been locking nut assemblies for removably securing bolts and studs. These assemblies have generally either been complicated or expensive, or not designed to secure a bolt of the type often used to mount lawn mower blades.

Fuller, et al., U.S. Pat. No. 5,205,693, issued on Apr. 27, 1993, discloses a quick-release bolt. A lawn mower bolt is provided in the form of an elongate shaft having a circumferential channel recessed around the fastening end. A bolt cap having a tubular side wall slides over the bolt fastening end. Opposing angled slots are provided in the tubular side wall to guide a pin riding laterally in each slot into the cap sufficiently to enter the recessed bolt channel and thus hold the bolt fastening end within the cap. An outer collar member fits around the cap and contains a spring-loaded washer which biases the pins into their slots and thus biases the apparatus to engage the bolt. Sliding the collar against the washer and against spring-loading moves the pins outwardly in their slots and clear of the channel to free the bolt to slide out of the cap when desired. The present invention provides a simpler, more rigid engagement apparatus.

Curran, U.S. Pat. No. 2,696,236, issued on Dec. 7, 1954, reveals a lock nut assembly including a special bolt and threaded outer and inner tube members. The bolt having a main shank is inserted through an opening in sheet stock and the threaded outer tube is screwed over the bolt until snugly seated. The bolt has a reduced diameter shank extending coaxially from its inserted end having other-handed threads relative to the bolt main shank. A locking flange protrudes radially inwardly from the outer tube member adjacent the inserted end of the bolt main shank. The inner tube member, also having other handed threads, is screwed over the reduced diameter shank of the bolt. An outwardly directed radial flange is provided on the inner tube member which rides against the outer tube member inwardly directed locking flange to make tight, high-friction contact. The edges of the inwardly and outwardly directed flanges are cut into V-shaped teeth for tool engagement during fastening and unfastening. A problem with Curran is that it cannot be used with a conventional bolt, and the need to manufacture a special bolt substantially increases its cost. Furthermore the inner tube member is so comparatively small that it might be easily lost.

DeFusco, U.S. Pat. No. 4,043,239, issued on Aug. 23, 1977, discloses a shim nut and screw bolt assembly. A bolt is inserted through a hole in a first sheet member to be secured. A second sheet member to be secured has a flanged opening with internal threads, and an externally threaded sleeve member is screwed into the flanged opening, so that it protrudes a distance out of the second sheet member, opposite the flange. This distance approximates the desired shim distance between the first and second sheet members. The bolt is screwed into the sleeve member, engaging internal sleeve member threads. A nylon button is provided in a cavity recessed into the threaded inner sleeve member surface. The bolt advances against and over the button, meeting friction resistance as it deforms the button. This causes the rotation of the bolt to turn the sleeve member, in turn causing the sleeve member to ride against and abut the first sheet member from one side. At the same time, the head of the bolt rides against and abuts the other side of the first sheet member, causing a locking engagement while maintaining the shim spacing. A problem with DeFusco is that its locking ability depends on the integrity of the nylon button, which could melt or otherwise deteriorate with age and use. Another problem is that the design of DeFusco largely limits its use to its intended shim application between sheet members.

Popp, U.S. Pat. No. 5,152,649, issued Oct. 6, 1992, reveals an expansion sleeve device for setting an anchor in a concrete slab. Popp includes an axially extending expansion sleeve and an axially extending anchor rod. The anchor rod head and much of the anchor rod shank are inserted into a hole in the slab of concrete, the anchor rod head being beveled outwardly toward the end of the hole. The expansion sleeve is fitted snugly around the shank of the anchor rod within the hole adjacent the anchor rod head, and has in inner diameter smaller than the diameter of the anchor rod head. The other end of the anchor rod is threaded and protrudes out of the concrete slab. A tubular liner is screwed over the protruding anchor rod end, and a shaft element extends from the liner coaxially with the rod, and has a hexagonal head. The head is rotated and bears against a collar member surrounding the liner, which in turn bears against the slab surface to draw the beveled head of the rod into the expansion sleeve, spreading the sleeve end and locking the anchor rod into the concrete slab. A problem with Popp is that its use is largely limited to anchor bolts, because it must axially advance the bolt into a locking position.

Orban, et al., U.S. Pat. No. 5,253,967, issued Oct. 19, 1993, teaches an adaptor assembly for tensioning threaded fasteners and a method of tensioning. A bolt to be tensioned is mounted in a structure of which the bolt is to become a part, so that the bolt threaded end protrudes. An internal sleeve having external threads and internal threads screws over the bolt end. An outer sleeve screws onto the external threads of the internal sleeve to rotate to abut and transfer bolt loading to the structure. A remote edge of the outer sleeve includes teeth which are engaged by a beveled gear mounted in a housing. A bolt tensioning element screws into the internal sleeve opposite and coaxially with the bolt end and stretches the bolt, moving the internal and outer sleeves away from the structure. As the bolt is stretched, the beveled gear is rotated to reposition the outer sleeve against the structure to transfer the tensile loading of the stretched bolt to the structure so that the tensioning element can be removed. A problem with Orban et al., is that the bolt must be stretched to cause the adapter assembly to lock. Orban et al. is also relatively complex and expensive to manufacture.

Bittern, U.S. Pat. No. 3,784,316, issued Jan. 8, 1974, teaches a hole saw reversible, quick-disconnect drive apparatus. The Bittern drive apparatus has a stud portion threaded in one direction at a first segment to cause engagement of a spring clutch assembly to rotate a hole saw blade. The stud portion is also threaded in the other direction at a second segment to cause disconnection of the apparatus from the hole saw blade. A problem with Bittern is that it locks only as long as torque is applied in one direction, but does not provide a reliable lock absent applied torque.

It is thus an object of the present invention to provide a bolt locking jam nut apparatus which can engage a conventional bolt.

It is another object of the present invention to provide such an apparatus which is inexpensive to manufacture.

It is still another object of the present invention to provide such an apparatus which is sturdy and reliable.

It is finally an object of the present invention to provide a method of using the apparatus which is simple to understand, easy and requires only ordinary tools.

SUMMARY OF THE INVENTION

The present invention accomplishes the above-stated objectives, as well as others, as may be determined by a fair reading and interpretation of the entire specification.

A jam nut apparatus is provided for fastening to a threaded end of a bolt to secure the bolt where the threaded end has first handed threads and where a conventional nut is fastened around the bolt threaded end, including a locking nut having an internal nut passageway with nut internal threads, the nut passageway having a first passageway end with an inwardly extending locking flange, a bolt end cap having a tubular cap side wall, the cap side wall having an open end with a locking edge and an inner surface with first handed internal threads, for engagingly receiving the threaded end of the bolt, the cap also having an outer surface with second handed external threads opposite to the first handed thread direction, external threads onto which the locking nut threads engagingly fasten, where the locking nut threads are oriented in the second handed direction, so that the locking nut may be rotatably advanced into locking contact with the conventional nut. The apparatus preferably additionally includes a cap closed end having an cap end wall for abutting the end face of the bolt when the bolt is inserted into the cap. The locking edge is preferably at a free end of a reduced diameter tubular locking portion extending axially from the cap open end, where the locking flange fits around and over the locking rim portion of the cap. The locking rim preferably has an inwardly beveled locking free edge to make wedge engagement with a conventional nut. The cap may additionally include a hex head extending radially outward from the cap closed end to permit tightening of the cap with a wrench. The locking nut may also additionally include a hexagonal circumferential outer surface to permit tightening of the locking nut with a wrench.

BRIEF DESCRIPTION OF THE DRAWINGS

Various other objects, advantages, and features of the invention will become apparent to those skilled in the art from the following discussion taken in conjunction with the following drawings, in which:

FIG. 1 is a side view of the inventive end cap, locking nut and conventional bolt end in an exploded relationship.

FIG. 2 is an axial view of the locking nut.

FIG. 3 is a cross-sectional side view of the end cap, locking nut and bolt end brought together for engagement, but not yet engaged.

FIG. 4 is a view as FIG. 3, but with the end cap, locking nut and bolt end screwed partly together.

FIG. 5 is a partial cross-sectional side view with the end cap, locking nut, conventional nut and bolt in locking engagement.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–5, a bolt locking Jam nut apparatus 10 is disclosed. Apparatus 10 fastens to the threaded end 12 of a bolt 14 to secure the bolt 14 against disengagement resulting from vibration, such as that transmitted through a lawn mower blade mounting bolt.

Apparatus 10 includes a tubular bolt cap 20 and a locking nut 60. Tubular bolt cap 20 preferably has a tubular wall 22 having internal threads 24 opening at a cap open end 26 for engagingly receiving the threads 28 at end 12 of a bolt 14, a cap closed end 32 having a cap end wall 34 for abutting the end face 36 of the inserted bolt 14. Cap 20 has external threads 42 onto which locking nut 60 engagingly fastens. Cap 20 also has a reduced diameter locking rim portion 44 extending axially from the cap open end 26, having an inwardly beveled locking edge 46. Cap 20 also has a hex head 48 extending radially outward from cap closed end 32 to permit tightening of cap 20 with a wrench.

Locking nut 60 has an inwardly directed, radial locking flange 62 at the nut outer end 64 which fits around and over locking rim portion 44 on bolt cap 20. Locking nut 60 also has a hexagonal circumferential outer surface 66 for engagement with a wrench. The internal cap threads 24 are right-handed to receive a conventional bolt end 12. The external cap threads 42 and locking nut threads 72 are left-handed. Alternatively, internal cap threads 24 and bolt 14 threads are left-handed and external cap threads 42 and locking nut threads 72 are right-handed.

Method

In practicing the invention, the following method may be used. A conventional nut 80 is fastened around bolt threaded end 12 and rotatingly advanced a distance along the bolt 14. The locking nut 60 is fastened onto cap 20 external threads 42 and cap 20 is fastened onto bolt threads 28. Then locking nut 60 is rotated to tightly abut conventional nut 80. In this way, friction between cap 20, conventional nut 80 and locking nut 60 prevent relative movement between cap 20 and bolt 14, and thus hold the bolt securely against vibration. Cap 20 is removable from bolt 14 by first backing conventional nut 80 away from locking nut 60 and cap 20.

In this illustrative method, the conventional nut represents the member being secured, but the member being secured may take some other form.

For example, a blade may be secured on a lawnmower having a spindle by extending a bolt through the spindle, finger tightening a cap nut a few threads on the upper end of the bolt and tightening the locking nut counter-clockwise on the spindle under the cap nut. To loosen, the locking nut is backed off and then the cap nut is backed off.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A jam nut apparatus for fastening to a threaded end of a bolt to secure said bolt wherein said threaded end has first handed threads, comprising:

a locking nut having an internal nut passageway with nut internal threads, said nut passageway having a first passage-way end with an inwardly extending locking flange, a bolt end cap having a tubular cap side wall, said cap side wall having an open end with a locking edge and an inner surface with first handed internal threads, for engagingly receiving said threaded end of said bolt, said cap also having an outer surface with second handed external threads opposite to said first handed thread direction, external threads onto which said locking nut threads engagingly fasten, wherein said locking nut threads are oriented in said second handed direction, said locking edge being at a free end of a reduced diameter tubular locking rim portion extending axially from said cap open end, wherein said locking flange fits around and over said locking rim portion of said cap.

2. An apparatus according to claim 1, additionally comprising a cap closed end having an cap end wall for abutting the end face of said bolt when said bolt is inserted into said cap.

3. An apparatus according to claim 1, wherein said locking rim has an inwardly beveled locking free edge to make wedge engagement with a member being secured.

4. An apparatus according to claim 2, wherein said cap additionally comprises a hex head extending radially outward from said cap closed end to permit tightening of said cap with a wrench.

5. An apparatus according to claim 1, wherein said locking nut additionally comprises a hexagonal circumferential outer surface to permit tightening of said locking nut with a wrench.

\* \* \* \* \*